(12) United States Patent
Viturro et al.

(10) Patent No.: US 7,969,625 B2
(45) Date of Patent: Jun. 28, 2011

(54) PITCH TO PITCH ONLINE GRAY BALANCE CALIBRATION WITH DYNAMIC HIGHLIGHT AND SHADOW CONTROLS

(75) Inventors: R. Enrique Viturro, Rochester, NY (US); Lalit Keshav Mestha, Fairport, NY (US); Joseph D. Hancock, Rochester, NY (US); Tonya L. Love, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/767,133

(22) Filed: Apr. 26, 2010

(65) Prior Publication Data
US 2010/0202005 A1 Aug. 12, 2010

Related U.S. Application Data

(63) Continuation of application No. 11/242,423, filed on Sep. 30, 2005, now Pat. No. 7,706,031.

(51) Int. Cl.
*H04N 1/46* (2006.01)
*G06K 15/00* (2006.01)
*G01D 18/00* (2006.01)

(52) U.S. Cl. ........ 358/504; 358/1.9; 358/3.01; 382/167; 399/49

(58) Field of Classification Search .................. 358/504, 358/518, 1.9, 3.01, 3.02; 382/167; 399/49
See application file for complete search history.

(56) References Cited

U.S. PATENT DOCUMENTS

| | | | |
|---|---|---|---|
| 6,133,932 A | 10/2000 | Webb et al. | |
| 6,755,498 B2 | 6/2004 | Revie et al. | |
| 6,804,479 B2 * | 10/2004 | Kimura | 399/49 |
| 6,968,148 B2 * | 11/2005 | Taka et al. | 399/301 |
| 7,009,733 B2 | 3/2006 | Gruzdev et al. | |
| 7,307,752 B1 * | 12/2007 | Mestha et al. | 358/1.9 |
| 7,483,186 B2 * | 1/2009 | Viturro et al. | 358/504 |
| 7,706,031 B2 * | 4/2010 | Viturro et al. | 358/504 |
| 2003/0090727 A1 | 5/2003 | Piatt et al. | |
| 2004/0136013 A1 * | 7/2004 | Mestha et al. | 358/1.9 |
| 2004/0136015 A1 * | 7/2004 | Van de Capelle et al. | 358/1.9 |
| 2005/0071104 A1 | 3/2005 | Viturro et al. | |
| 2005/0105112 A1 * | 5/2005 | Fukuda | 358/1.9 |
| 2005/0238374 A1 | 10/2005 | Yoshida | |
| 2005/0243342 A1 | 11/2005 | Abramsohn | |
| 2006/0197966 A1 * | 9/2006 | Viturro et al. | 358/1.9 |
| 2006/0221340 A1 | 10/2006 | Viturro et al. | |

* cited by examiner

*Primary Examiner* — Twyler L Haskins
*Assistant Examiner* — Kent Yip
(74) *Attorney, Agent, or Firm* — Fay Sharpe LLP (57) ABSTRACT

An automatic gray balance control system to produce TRCs for all primary colors in a reproduction device and for each pitch of a photoreceptor system by printing target patches for each pitch, measuring the output colors, and automatically readjusting the tone reproduction curves until a satisfactory level of accuracy is obtained as compared to the theoretical desired output. The system produces pitch-based gray balanced TRCs that are updated frequently for each pitch, with different TRCs for different pitches, to ensure consistency in output from pitch to pitch as well as from page to page on a given pitch.

21 Claims, 9 Drawing Sheets

PITCH TO PITCH ONLINE GRAY BALANCE CALIBRATION WITH DYNAMIC HIGHLIGHT AND SHADOW CONTROLS

INCORPORATION BY REFERENCE

This is a continuation of application U.S. Ser. No. 11/242,423, filed Sep. 30, 2005, entitled "Pitch to Pitch Online Gray Balance Calibration with Dynamic Highlight and Shadow Controls," the disclosure of which is hereby incorporated by reference in its entirety.

CROSS-REFERENCE TO RELATED APPLICATIONS

This application is related to U.S. patent application Ser. No. 09/566,291, filed on 5 May 2000 and entitled, "Online Calibration System for a Dynamically Varying Color Marking Device;" U.S. patent application Ser. No. 09/862,247, filed on 22 May 2001, now U.S. Pat. No. 6,621,576, issued on 16 Sep. 2003, and entitled, "Color Imager Bar Based Spectrophotometer for Color Printer Color Control System;" U.S. patent application Ser. No. 09/862,945, filed on 22 May 2001, now U.S. Pat. No. 6,633,382, issued on 14 Oct. 2003, and entitled, "Angular, Azimuthal and Displacement Insensitive Spectrophotometer for Color Printer Color Control Systems;" U.S. patent application Ser. No. 09/863,042, filed on 22 May 2001, now U.S. Pat. No. 6,556,300, issued on 29 Apr. 2003, and entitled, "Color Imager Bar Based Spectrophotometer Photodetector Optical Orientation;" U.S. patent application Ser. No. 09/949,475, filed on 10 Sep. 2001, now U.S. Pat. No. 6,639,669, issued on 28 Oct. 2003, and entitled, "Diagnostics for Color Printer On-line Spectrophotometer Control System;" U.S. patent application Ser. No. 10/248,387, filed on 15 Jan. 2003, and entitled, "Systems and Methods for Obtaining a Spatial Color Profile and Calibrating a Marking System;" U.S. patent application Ser. No. 10/342,873, filed on 15 Jan. 2003, and entitled, "Iterative Printer Control and Color Balancing System and Method Using a High Quantization Resolution Halftone Array to Achieve Improved Image Quality with Reduced Processing Overhead;" U.S. patent application Ser. No. 11/070,681, filed on 2 Mar. 2005, and entitled, "Gray Balance for a Printing System of Multiple Marking Engines;" U.S. patent application Ser. No. 11/097,727, filed on 31 Mar. 2005, and entitled, "Online Gray Balance Method with Dynamic Highlight and Shadow Controls;" the disclosures of which are incorporated by reference in their entirety.

BACKGROUND AND SUMMARY

Embodiments are generally related to printing methods and systems. Embodiments are also related to developing tone reproduction curves that facilitate consistent and accurate printing from pitch to pitch on a photoreceptor and/or an intermediate transfer belt and/or other marking element.

Embodiments refer to printing as the art of producing a pattern, such as text and images, on a substrate, such as paper or transparent plastic. A marking engine performs the actual printing by depositing ink, toner, dye, or similar patterning materials on the substrate. For brevity, the word "ink" will be used to represent the full range of patterning materials. In the past, the pattern was introduced to the marking engine in the form of a printing plate or a light lens. Modernly, digital data are commonly used to specify the pattern. The pattern can be a data file stored in a storage device and/or transmitted to the printer via a network, radio transmission, infrared radio transmission, and the like.

A popular marking engine today is the xerographic marking engine used in many digital copiers and printers. In such a marking engine, a photoreceptor whose electrostatic charge vanes in response to light is placed between an ink supply and the substrate. In xerographic systems, the ink is typically toner. A laser or bank of light emitting diodes is used to expose the photoreceptor to light to form an image of the pattern to be printed on the photoreceptor. In the simplest, monochromatic xerographic engines, toner is applied to the image to create a toner image on the photoreceptor, which toner image is then fused onto the substrate. In more complex systems, additional colors of toner are applied.

Figure 1:
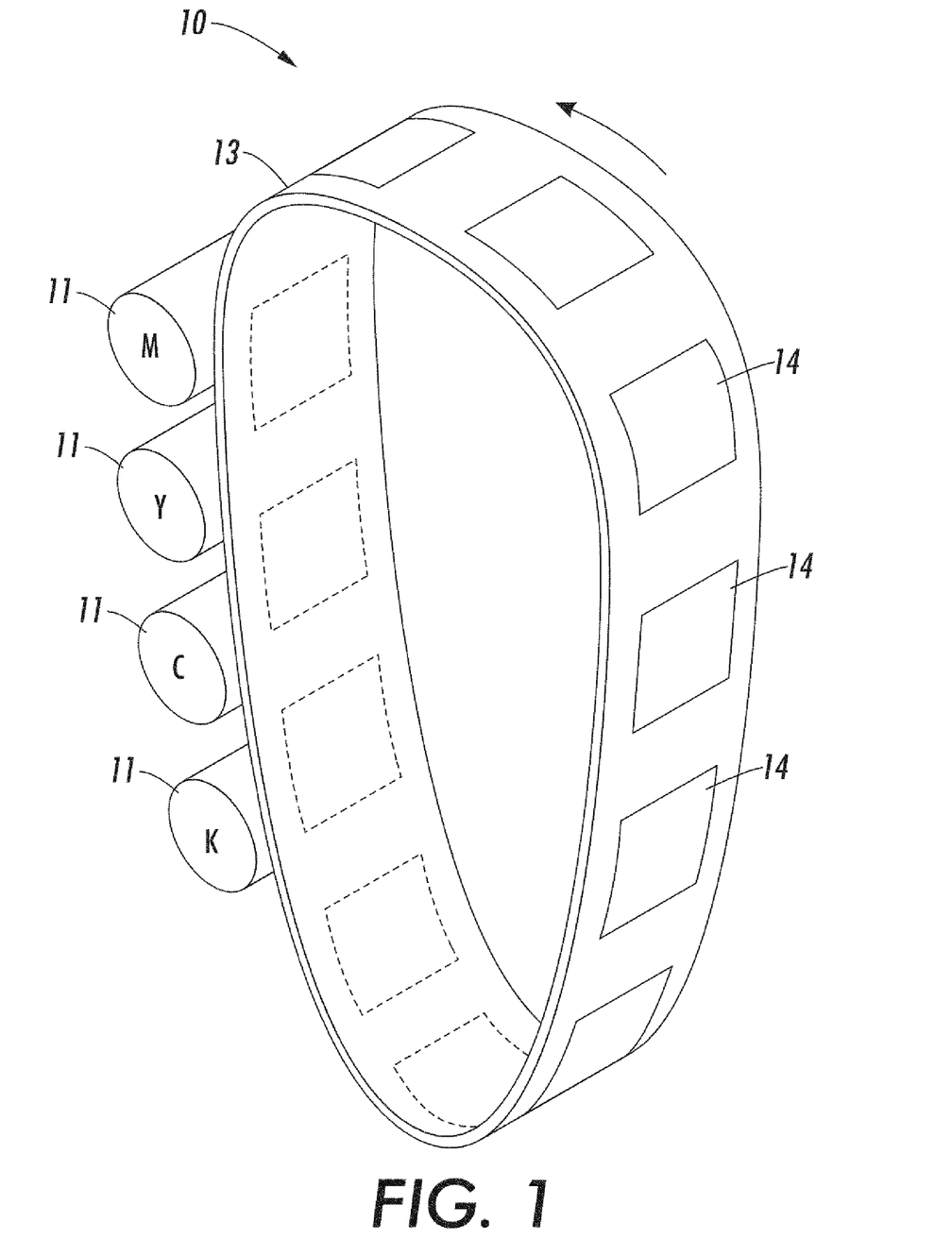
FIG. 1 schematically illustrates an Image On Image (IOI) printing engine showing multiple pitches on the photoreceptor.

Color systems include Image On Image (IOI) systems and tandem systems. In an IOI system, such as that shown schematically in FIG. 1, the engine 10 includes plural primary colors 11 which deposit their inks on the photoreceptor 13, which includes multiple pitches 14. The single photoreceptor 13, such as a belt, receives the first toner image in a first color, which remains on the photoreceptor 13 while a second toner image is created in a second color atop the first image, the first and second toner images remain on the photoreceptor while a third toner image is created in a third color atop the first and second images, et cetera. Once all of the toner images have been placed on the photoreceptor 13, they are transferred to the substrate, typically paper, and fused to the substrate.

Figure 2:
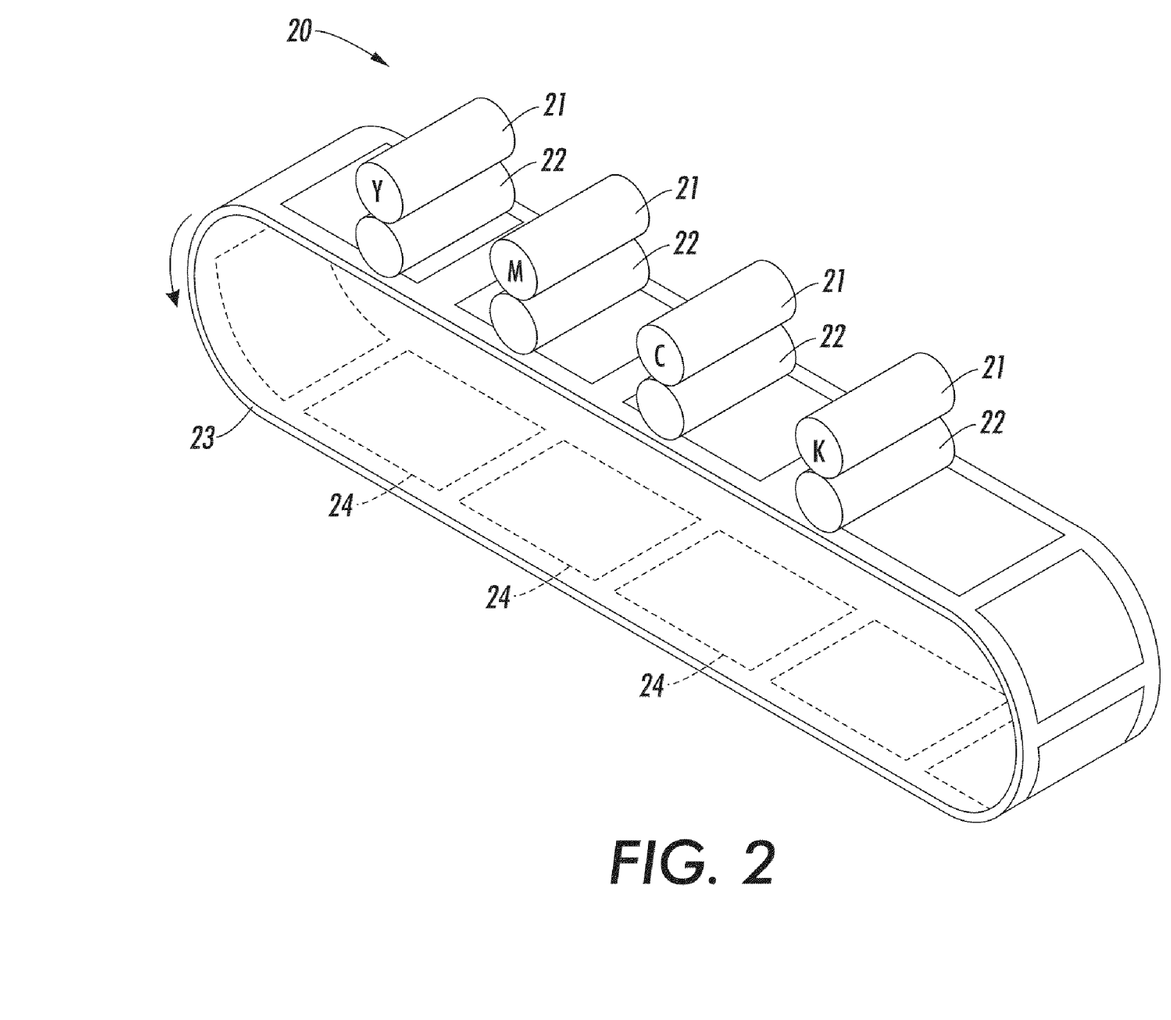
FIG. 2 schematically illustrates a tandem printing engine showing multiple pitches on the intermediate transfer belt (ITB).

In an embodiment of tandem system architecture, such as that shown in FIG. 2, the marking engine 20 includes multiple primary colors 21 which first deposit their inks on respective photoreceptors 22, typically drums, to form toner images, which are then deposited on the intermediate transfer belt (ITB) 23, which includes multiple pitches 24. Each toner image transferred onto the ITB before the next toner image is formed. Like the IOI system, the toner images are fused once all for a given pitch have been deposited on the ITB.

In a variant of the tandem system shown in FIG. 2, each ink station can include an additional drum between the photoreceptor and the ITB, an intermediate drum, that accepts the toner image from the photoreceptor drum and deposits it on the ITB. The inclusion of the intermediate drum reduces the likelihood of toner of another color getting into a given ink source due to electrostatic interactions between the toner image on the ITB and the photoreceptor drum. Each of the printing architectures found in the marketplace has advantages, but all suffer from color reproduction problems.

In color science, color spaces are used to describe colors. For example, the Pantone colors are a color space commonly used by graphic artists to identify different colors. Another important color space defined by the CIE is known as L*a*b*, where L*, a*, and b* specify color coordinates. One of the most important properties of L*a*b* is that it is device independent. In other words, a L*a*b* color will theoretically be the same regardless of when or how it is produced and by what particular device it is produced. However, because of the nature of ink and marking, particularly color ink, placing a mixture of ink on substrate that should theoretically produce a particular L*a*b* color does not necessarily produce that particular color. One of the commonly used ways in which the difference between the desired color and the printed one is quantified by its Euclidian distance in color space. If $L^*_0 a^*_0 b^*_0$ and $L^*_1 a^*_1 b^*_1$ are the L*a*b* of the desired color and of the printed color, then the difference, $\Delta E$, is defined by the following equation $$\Delta E = ((L_1^* - L_0^*)^2 + (a_1^* - a_0^*) + (b_1^* - b_0^*))^{1/2} \qquad (1)$$

It should be appreciated that many other color difference equations are also in use, and not disclosed in this application, which consider perceptual aspects of human visual system. Equation (1) above is thus an example color difference expression.

Part of the reason for the discrepancy between desired and obtained colors is that a different color space, CMYK, is commonly used in printing. The letters CMYK refer to the cyan, magenta, yellow, and black inks that color printers typically use and are primary colors in such systems. Mixing these inks produces the other colors that a marking engine can print.

The problem with CMYK is that it is not device independent for various reasons. One such a reason is that the pigments of inks are not naturally balanced, and their equal combination does not produce a neutral gray. Another reason is that different inks from different sources mix differently on different substrates. For example, in one situation, a certain combination of cyan, magenta, and yellow ink will produce a particular shade of gray. In another situation, the combination could produce a greenish gray. Of course, the color space will be different in printers using other or additional primary colors. For example, some printers add Orange and Violet, creating a six-dimensional color space, but the problem of color variance remains.

Interestingly, it has been found that compensating for color variance throughout the color gamut of the color printer can be achieved by adjusting the ink mixture to produce gray level balance. This can be performed by printing one or more test patches based on particular requested gray levels, analyzing the output with a spectrophotometer, and generating a tone reproduction curve (TRC). The TRC is then used to alter the theoretical combination of ink to produce more accurate color with an actual combination.

An example of method is seen in U.S. patent application Ser. No. 11/097,727, filed 31 Mar. 2005 and entitled, "Online Gray Balance Method with Dynamic Highlight and Shadow Controls," incorporated by reference above. TRCs are used to map an input value to an output value as seen, for example, in FIG. 9, to adjust ink application levels.

Figure 9:
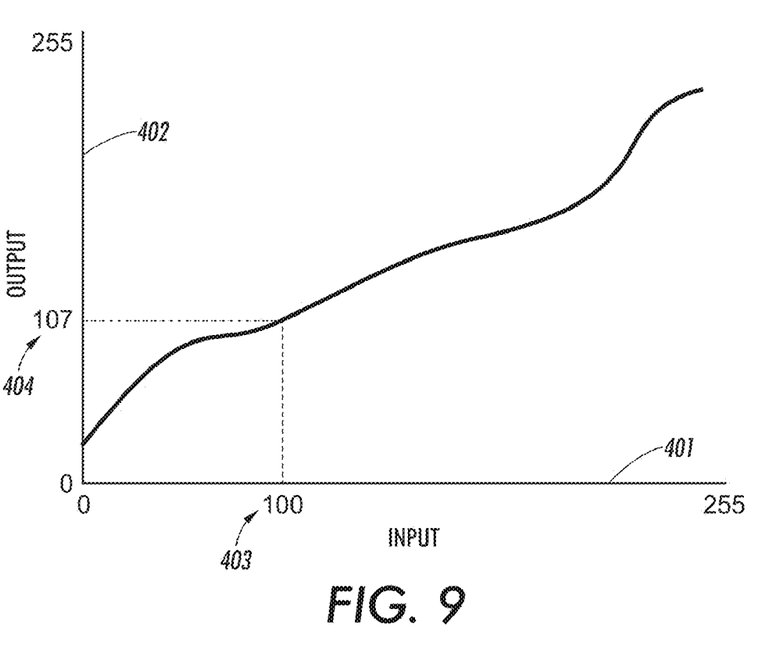
FIG. 9 schematically illustrates a TRC for a color separation according to embodiments.

To show how TRCs can be employed to adjust ink application levels, a TRC for one of the color separations is shown in FIG. 9, albeit not to scale. The input axis 401 and the output axis 402 both have saturation values ranging from 0 to 255, with 0 indicating no saturation (no ink on the substrat and 255 indicating complete saturation (as much ink as possible on the substrate). Saturation values between 0 and 255 indicate intermediate amounts of ink are deposited. Without a TRC, a request for 100 yellow based on a desired color representation results in a corresponding amount of ink. As described above, the inclusion of 100 yellow may not yield the desired color, and with a TRC, a request for 100 yellow can be mapped to a different amount of ink that will produce the desired color. In FIG. 9, when 100 units of ink are input 403, the TRC maps the input to an actual value of 107 output 404. The TRC of FIG. 9 thus maps a request for 100 units of ink into a request for 107 units of ink to produce the desired color.

When using cyan, magenta, yellow, and black inks to produce a process gray. TRCs can be used to more accurately produce a desired gray. If, for example, one desires a process gray of 128 cyan, 128 magenta, 128 yellow, and 0 black, but the marking engine used must employ 131 cyan, 127 magenta, and 130 yellow, and 0 black to achieve the desired result, TRCs can adjust the requested amounts so that the marking engine deposits 131 cyan, 127 magenta, 130 yellow, and 0 black, yielding the desired process gray. Preferably, a different TRC is used for each ink that a marking engine uses so that a CMYK marking engine will have four TRCs. TRCs can have different ranges of saturation values, such as 0 to 1, 0 to 100, or 0-255. Regardless of the input range and output range, all TRCs are used to adjust the amount of ink deposited by mapping an input value to an output value.

In the '727 application, a TRC is normally produced by an algorithm that fits a curve to a series of knots, which can be determined from calibration data. Printing a calibration patch pattern yields a target patch pattern. The desired reflectances of the calibration patches and the measured reflectances of target patches can be used as calibration data. The series of knots can also include a highlight knot and a shadow knots so that the TRC functions better in the highlight and shadow regions.

More specifically, the '727 application discloses a system and method for producing TRCs that work well over all saturation values, including highlights and shadows, by supplying data to produce better TRCs for highlights and shadows. A storage device stores a calibration patch pattern and the calibration patch pattern includes at least two calibration patches. A marking engine can produce a target patch pattern by printing the calibration patch pattern.

The system produces a target patch pattern by using a marking engine to print a calibration patch pattern on a substrate. The calibration patch pattern includes at least two calibration patches. Each calibration patch is developable and has a desired reflectance. When the target patch pattern is produced, each calibration patch is printed as a target patch. The system obtains target reflectances by measuring target patches that are in the target patch pattern. At least two target reflectances can be obtained because the target patch pattern has at least two target patches. The system then determines a target highlight value from data that includes an input highlight value, the target reflectances, and the desired reflectances. The calibration data preferably includes at least one target saturation and at least one maximum desired saturation. Target saturation relates to the amount of ink that is deposited on a substrate. The target saturation can be the maximum amount of a particular ink that the marking engine can deposit on the substrate. The particular ink can be black or a primary color such as cyan, magenta, or yellow. Calibration data can be used to produce a tone reproduction curve. The method can be enhanced by allowing a user to select a target saturation for any of the inks, including cyan, magenta, yellow, or black, that a marking engine uses. A calibration patch based on the user selected saturation can be printed to produce a target patch whose target reflectance is obtained by measuring the target patch. The target reflectance can then be included in calibration data used to produce a tone reproduction curve. Obtaining at least two target reflectances for the patch, a processor uses the target reflectances and input highlight value to produce a target highlight value and a tone reproduction curve which is stored on a storage device.

The '727 application disclosure, however, does not deal with the variations seen from pitch to pitch in multiple pitch systems. Because the magnitude of pitch signature changes with time due to various reasons (e.g., by developer aging, IBT aging, differential belt wear, etc.), embodiments disclosed herein include a calibration and control methodology for achieving high quality and consistent color balanced printing for printers with periodic pitch-to-pitch variations. Preferably, calibration methods for single pitches can be employed, such as the method referred to above. Embodiments contemplate having gray balanced TRCs and updating them frequently for each pitch, thus having different TRCs for different pitches. Embodiments use customized TRCs for each pitch during the course of printing to obtain consistency between pages printed on different pitches. Additionally, embodiments can obtain a customized gray balanced CMYK TRCs for each pitch using control based iterative gray balance methods using a reduced patch set with as few as twenty-two patches, which is easy to schedule to gray balance the print engine on a per pitch basis. Typically, the calibration job is performed as a separate job, then a print job or multiple print jobs are performed before another calibration job is performed. However, embodiments contemplate such calibration during run time.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DESCRIPTION

The particular values and configurations discussed in these non-limiting examples can be varied and are cited merely to illustrate embodiments. They are not intended to limit the scope of the invention.

As described above, when equal amounts of cyan, magenta and yellow are printed on white paper, a well-balanced printer should produce a neutral process gray of the same amount. However, the system will usually not produce that gray due to various limitations on color pigments of the primary colors used by and the internal processes of the print engine. To overcome this effect, gray balanced TRCs obtained by iterative methods, such as those described above and disclosed U.S. application Ser. Nos. 09/566,291, 11/070,681, and 11/097,727 incorporated by reference above, can be employed to apply the right amount of cyan, magenta and yellow proportions for all contone values depending on the state of the materials and the print engine. This approach can be extended to produce gray balanced TRCs for spatial uniformity corrections as disclosed, for example, in U.S. patent application Ser. Nos. 10/248,387 and 10/342,873, incorporated by reference above. However, none of these methods have discussed an approach for reducing gray variations on a pitch-to-pitch basis.

As disclosed above, there are many factors that contribute to pitch-to-pitch variations, but photoreceptor/ITB variations are among the root causes for consistency errors in images. Substantial differences in gray have been observed, for example $\Delta E > 3$, when the same gray images are printed on different pitches in a photoreceptor belt. This difference is even larger for saturated colors.

Yet it has been found that if the pitch-to-pitch variation of gray images is reduced, the saturated colors also show improvements. Embodiments thus contemplate a method to generate gray balanced TRCs that are customized to each pitch during the process of building the TRCs. This approach can be implemented in the digital front end (DFE) of a marking engine or in the image path of a marking engine, such as in a color rendition module. Embodiments are particularly advantageous when inline sensors can be used.

The calibration and control methodology of embodiments achieves high quality and consistent color balanced printing for printers with periodic pitch-to-pitch variations. The factors discussed above cause the magnitude of pitch signal change over time, and the gray balanced TRCs, preferably updated frequently for each pitch, with different TRCs for each pitch, can balance such variations. Using customized TRCs for each pitch during the course of printing yields consistency between pages printed on different pitches. Additionally, embodiments can obtain a customized gray balanced CMYK TRC for each pitch using control based iterative gray balance methods with a reduced patch set. For example, embodiments including as few as twenty-two patches in a calibration patch pattern have been successful. As a result, it is easy to schedule the TRCs to gray balance the print engine on a per pitch basis.

Figure 3:
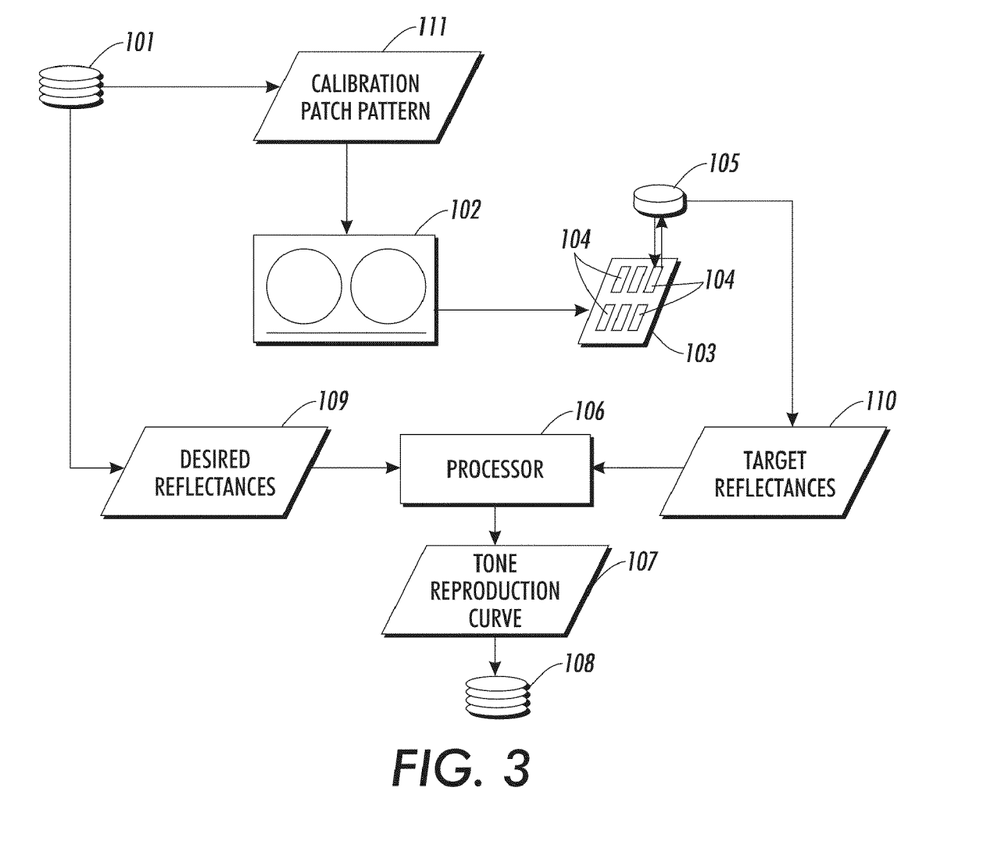
FIG. 3 schematically illustrates a marking engine undergoing calibration by producing a TRC according to embodiments.

FIG. 3 illustrates a marking engine 102 undergoing calibration according to an exemplary method of generating a tone reproduction curve that can be used in embodiments. This exemplary method is based on that disclosed in U.S. patent application Ser. No. 11/097,727, incorporated by reference above. A storage device 101 stores a calibration patch pattern 111 in the form of data. The calibration patch pattern 111 includes a number of calibration patches and every calibration patch has a desired reflectance. As such, the storage device 101 also stores desired reflectances 109. A reflectance can specify any color, including black and shades of gray. The marking engine 102 accepts the calibration patch pattern and prints a target patch pattern 103. The target patch pattern 103 includes target patches 104. Every target patch 104 is associated with a calibration patch because every target patch 104 results from the printing of a calibration patch. Examples of the particular calibration of embodiments are described below.

A reflectance measuring device 105, such as the reflectance measuring device disclosed in U.S. Pat. No. 6,384,918 to Hubble et al., which issued on May 7, 2002 and which is incorporated herein by reference, measures the target patches 104 to produce target reflectances 110. A target reflectance generally is the reflectance measurement that the reflectance measuring device 105 obtains from a target patch 103. The target reflectances 110 and the desired reflectances 109 are used by a processor 106 to produce a tone reproduction curve 107 which can then be stored on a storage device 108.

Figure 4:
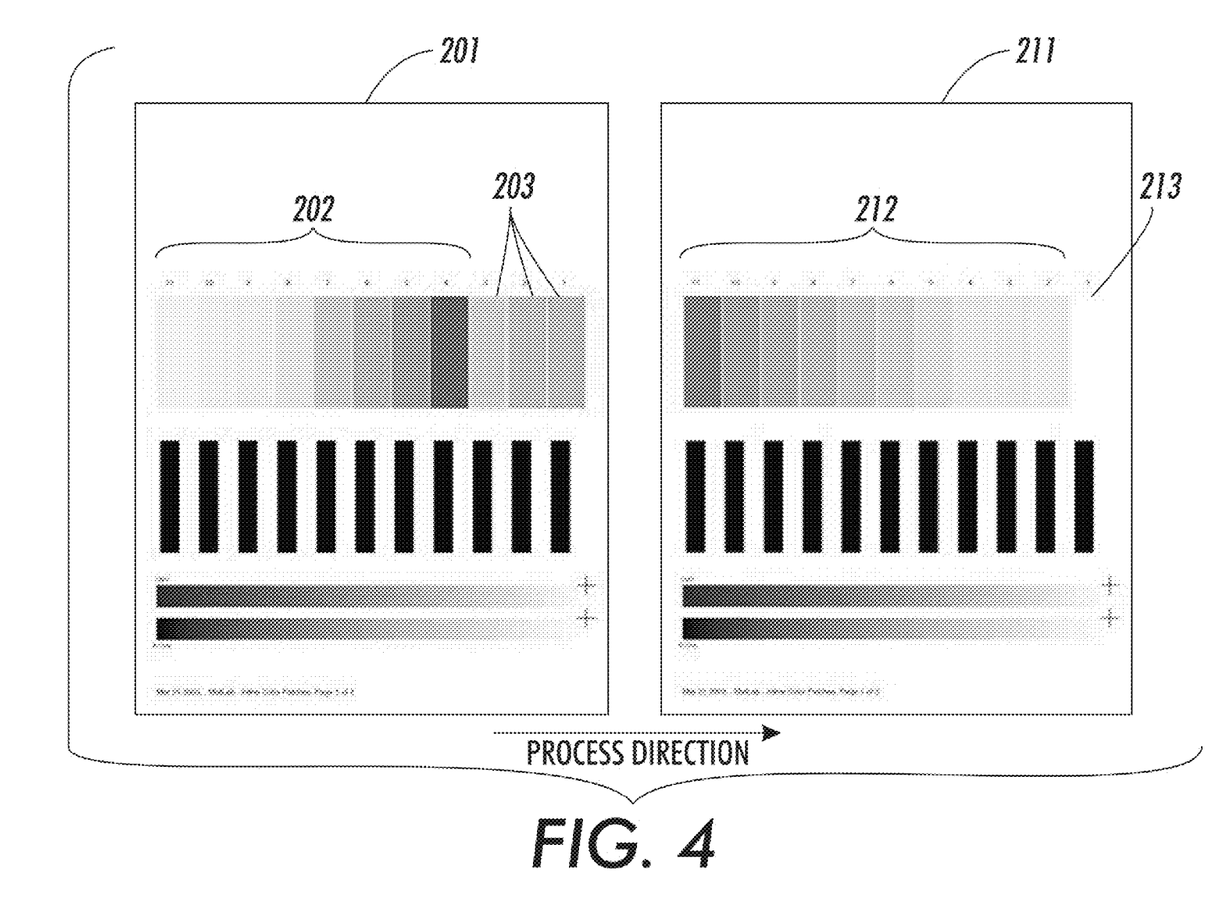
FIG. 4 schematically illustrates a possible target patch pattern according to embodiments.

FIG. 4 illustrate, one possible target patch pattern that can be used in embodiments. While the pattern shown includes 22 patches divided into two portions over two pages, this need not be the particular number of patches or the particular configuration, and embodiments contemplate placing the entire pattern on a single page as well as using different nos. of patches. The pattern preferably includes a series of black ink produced gray patches 202, a series of primary color patches 203, and a series of process gray patches at various saturation levels 212. If required, such as due to limitations of sensors used to evaluate the patches, the pattern of FIG. 4 can be broken into a first page 201 and a second page 211.

The series of black patches 202 includes patches with various levels of blank ink or toner saturation across the range achievable by the printer. For example, the black patches 202 can include patches between 5% and 90% saturation. The paper outside of and between the patches can be measured to find the reflectance of unpatterned substrate areas. The black patches 202 are formed using only black ink. The series of primary color patches 203 preferably includes a saturated patch of each primary color, such as cyan ink, magenta ink, and yellow ink. As seen in FIG. 4, embodiments can include eight black patches 202 and one primary color patch 203 for each primary color.

The series of process gray patches 212 in embodiments are printed using the CMY inks to produce gray patches. One patch 213 is preferably not marked with ink toner and can be used, for example, to characterize the substrate color. The CMY gray patches 212 are used in conjunction with the black patches 202 to provide tone reproduction curves for cyan, magenta, yellow and black ink separations, as disclosed, for example, in U.S. patent application Ser. No. 11/097,727, incorporated by reference above. As seen in FIG. 4, the method employs ten CMY/process gray patches 212 and one unmarked patch 213, but other numbers of such patches could be employed.

The target patch pattern of embodiments can be divided into two portions, particularly when U.S. Letter (8.5"×11") paper or the like is used, as seen in FIG. 4 and mentioned above. A first page 201 includes the black patches 202 and primary color patches 203; and a second page 211 includes the process/CMY gray patches 212 and the unmarked patch 213. This arrangement is beneficial when a sensor used to analyze the various patches is limited, such as in the number of such patches it can detect at a given time. In the case of the arrangement shown in FIG. 4, the target patch pattern of embodiments and the overall method of embodiments can be used in a machine using a sensor limited to eleven patches at a time for U.S. Letter (8.5"×11") paper. Other arrangements of the target patch pattern can be used as appropriate for various types of sensors and sizes of paper. For example, the entire pattern could be formed on a single page.

Figure 5:
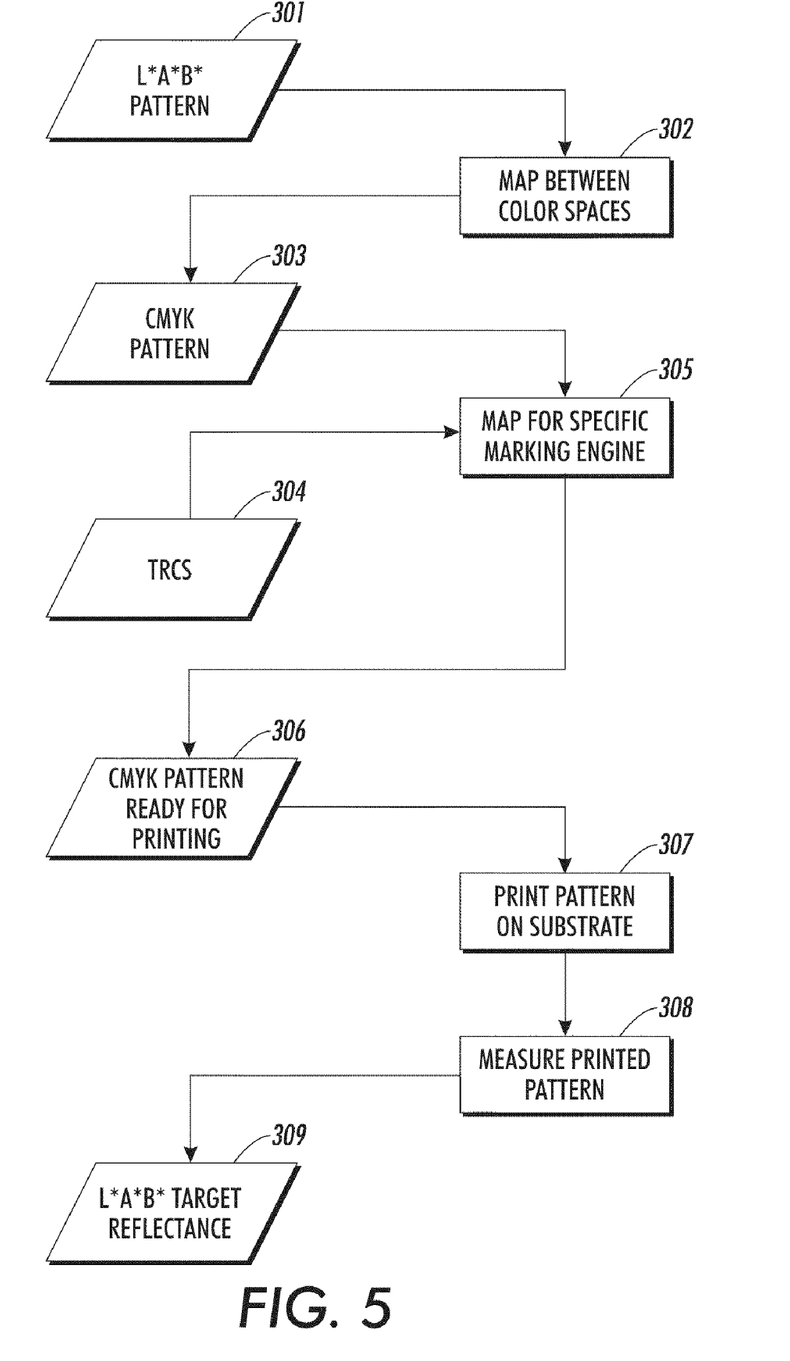
FIG. 5 shows some possible relationships between patch patterns, color spaces, and measurements according to embodiments.

FIG. 5 shows some possible relationships between patch patterns, color spaces, and measurements. L*a*b* pattern 301 can be used to specify the desired output from a marking engine. Mapping between color spaces 302 produces a CMYK pattern 303 from the L*a*b* pattern. The mapping can be different for different situations because L*a*b* is invariant and CMYK is not. Mapping for a specific marking engine 305 involves using tone reduction curves (TRCs) 304 to adjust the CYMK pattern 303 to produce a CMYK pattern ready for printing 306. The pattern can then be printed on the substrate. Usually, nothing more is done once the printed pattern is produced.

More, however, can be accomplished. For example, the printed pattern can be measured 308 for quality control or calibration purposes. A measuring device, such as the in-line spectrophotometer disclosed in U.S. Pat. No. 6,384,918, incorporated by reference in its entirety, can measure the reflectance of some areas of the printed pattern to produce an L*a*b* target reflectance 309. Comparing the L*a*b* pattern 301 to the L*a*b* target reflectance 309 can reveal the differences between the marking engine's desired output and its actual output. In quality control scenarios, small enough differences can indicate acceptable quality. In calibration scenarios, the differences can be used to adjust the TRCs. Proper adjustment of the TRCs can minimize the differences.

In calibration scenarios, the L*a*b* pattern 301 can be a calibration patch pattern. When a calibration patch pattern is printed, the printed pattern is a target patch pattern such as that shown in FIG. 4. TRCs 304 can be used during calibration, but it is sometimes more convenient not to use them. When no TRC is used, the CMYK pattern 303 and the pattern ready for printing 306 are equivalent. A target patch pattern is measured by determining the reflectance of individual patches in the pattern. Furthermore, target patch patterns can have patches of many different colors. For example, a target patch pattern can have cyan, magenta, yellow and black patches. It can have gray patches produced with black ink. It can have gray patches produced by printing a combination of cyan, magenta, and yellow inks. In general, a target patch pattern can have patches of any color, shade, or saturation that is obtainable with the inks and the marking engine.

Figure 6:
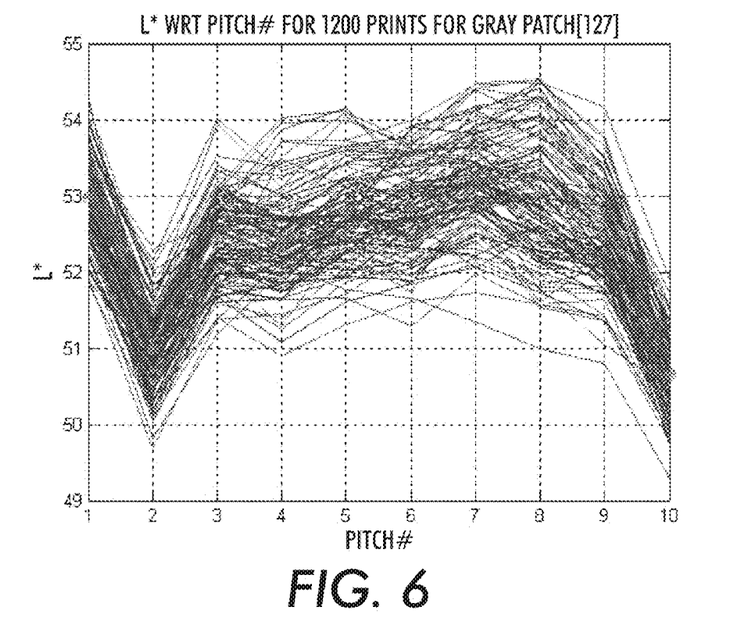
FIG. 6 shows an example of a L* coordinate plot of 50% gray patches with respect pitch number, printed for 120 belt revolutions, according to embodiments.
Figure 7:
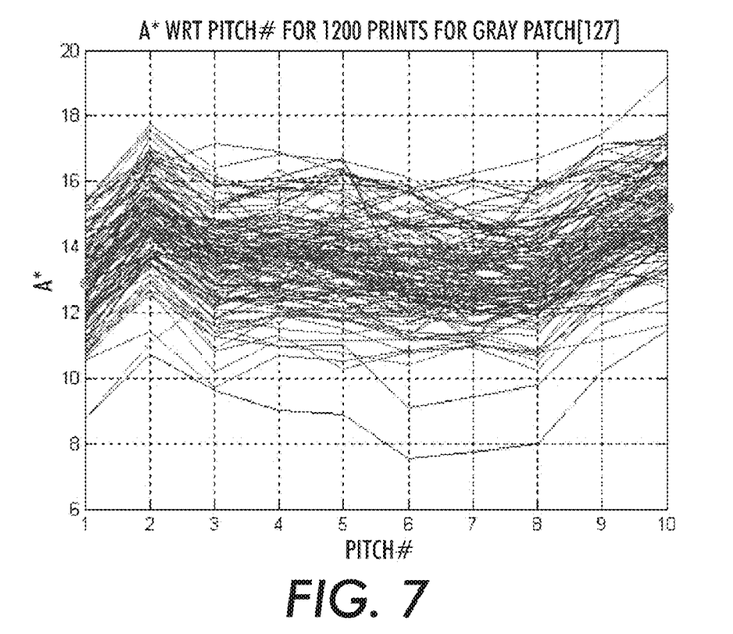
FIG. 7 shows the corresponding a* plot for the 50% gray patches shown in FIG. 6 according to embodiments.
Figure 8:
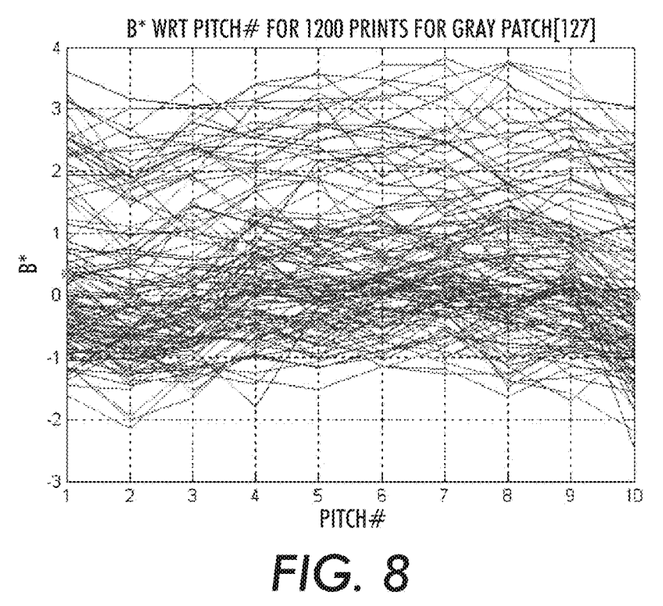
FIG. 8 show the corresponding b* plot for the same 50% gray patches shown in FIG. 6 according to embodiments.

FIG. 6 shows an example of a L* coordinate plot of 50% gray patches with respect to pitch number, printed for 120 belt revolutions in a prototypical printer. FIGS. 7 and 8 show the corresponding a*, and b* plots for the same 50% gray patches. Tables 1 and 2 show mean L*, a* and b* values and the corresponding ΔE numbers with respect to each pitch using the mean L*a*b* values.

TABLE 1

Mean L*, a*, b* values for 120 belt revolutions shown with respect to pitch

| Pitch# | Mean L* | Mean a* | Mean b* |
|---|---|---|---|
| 1 | 52.98 | 12.9 | 0.34 |
| 2 | 50.99 | 14.87 | 0.08 |
| 3 | 52.45 | 13.55 | 0.27 |
| 4 | 52.41 | 13.63 | 0.56 |
| 5 | 52.75 | 13.61 | 0.62 |
| 6 | 52.82 | 13.22 | 0.65 |
| 7 | 53.21 | 13.03 | 0.71 |
| 8 | 53.01 | 13.15 | 0.57 |
| 9 | 52.46 | 14.39 | 0.52 |
| 10 | 50.66 | 15.17 | 0.01 |

TABLE 2

ΔE between various pitches with respect to a given pitch (zero for ideal engine)

| Pitch# | ΔE with respect to Pitch Numbers | | | | | | | | | |
|---|---|---|---|---|---|---|---|---|---|---|
| | 1 | 2 | 3 | 4 | 5 | 6 | 7 | 8 | 9 | 10 |
| 1 | 0 | 2.81 | 0.84 | 0.95 | 0.79 | 0.47 | 0.46 | 0.34 | 1.59 | 3.26 |
| 2 | 2.81 | 0 | 1.98 | 1.95 | 2.24 | 2.54 | 2.96 | 2.71 | 1.61 | 0.45 |
| 3 | 0.84 | 1.98 | 0 | 0.3 | 0.47 | 0.62 | 1.02 | 0.75 | 0.88 | 2.43 |
| 4 | 0.95 | 1.95 | 0.3 | 0 | 0.35 | 0.59 | 1.01 | 0.77 | 0.76 | 2.4 |
| 5 | 0.79 | 2.24 | 0.47 | 0.35 | 0 | 0.4 | 0.75 | 0.53 | 0.84 | 2.68 |
| 6 | 0.47 | 2.54 | 0.62 | 0.59 | 0.4 | 0 | 0.44 | 0.22 | 1.23 | 2.98 |
| 7 | 0.46 | 2.96 | 1.02 | 1.01 | 0.75 | 0.44 | 0 | 0.27 | 1.57 | 3.41 |
| 8 | 0.34 | 2.71 | 0.75 | 0.77 | 0.53 | 0.22 | 0.27 | 0 | 1.36 | 3.16 |
| 9 | 1.59 | 1.61 | 0.88 | 0.76 | 0.84 | 1.23 | 1.57 | 1.36 | 0 | 2.03 |
| 10 | 3.26 | 0.45 | 2.43 | 2.4 | 2.68 | 2.98 | 3.41 | 3.16 | 2.03 | 0 |

For an ideal print engine, the variation of ΔE in Table 2 should be negligible. Instead, a maximum of 3.4 ΔE has been observed. To minimize pitch-based ΔE variation, embodiments modify the digital contone image or the binary contone image using different gray balanced TRCs, one TRC for each pitch. Generating these TRCs for each separation on a pitch-to-pitch basis and manipulating the digital value of CMYK images differently for each pitch according to embodiments can reduce or eliminate the problem.

Figure 10:
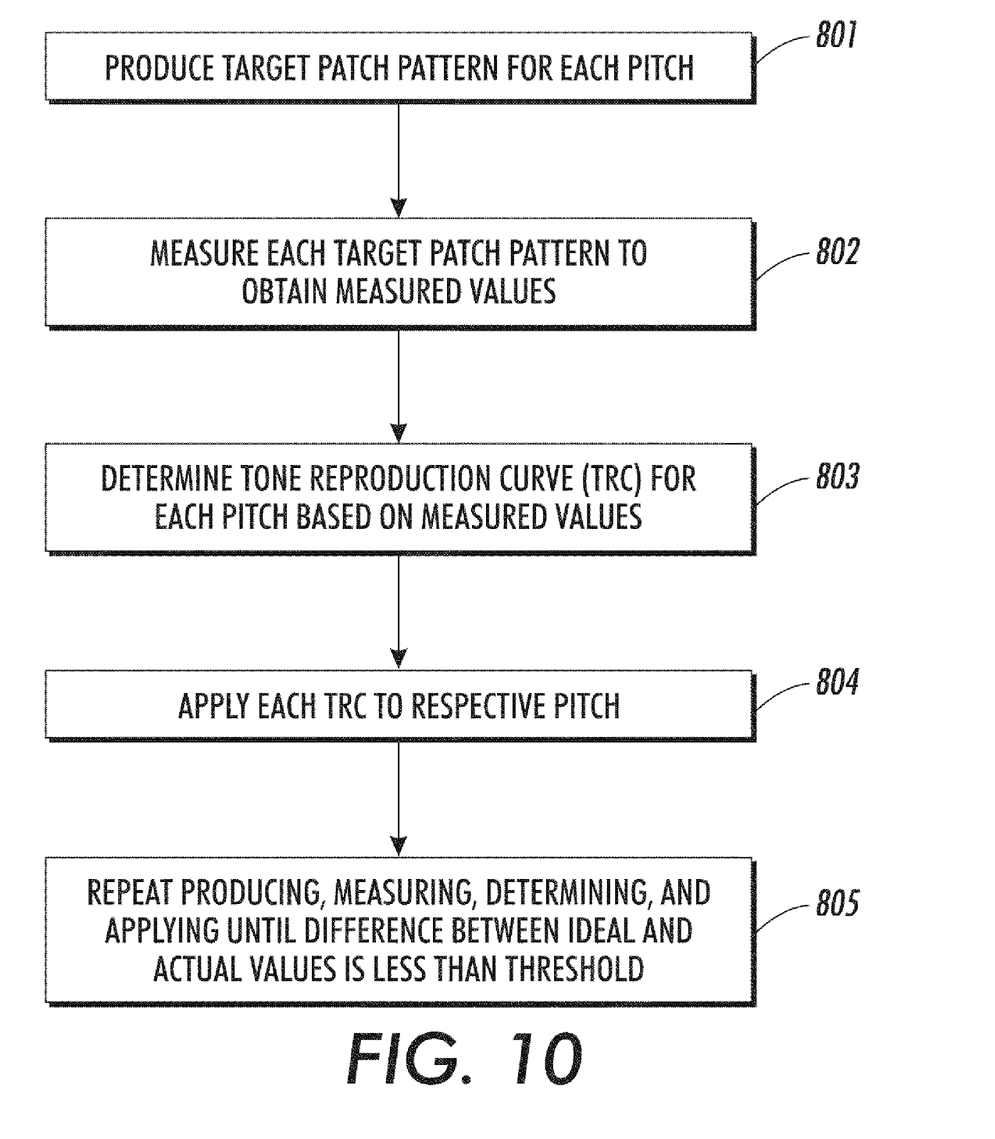
FIG. 10 schematically illustrates a calibration method according to embodiments
Figure 11:
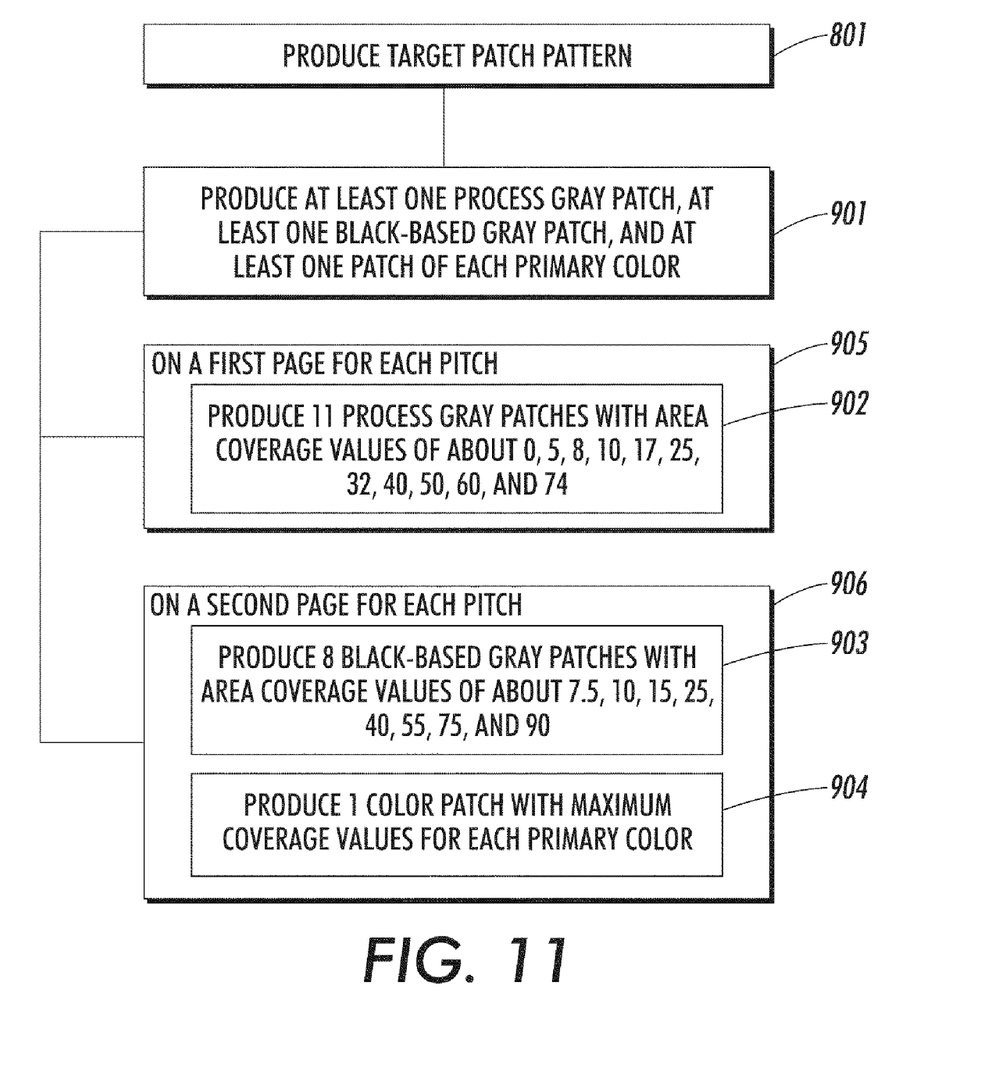
FIG. 11 schematically illustrates a variation of a calibration method of embodiments.

In particular, embodiments focus on building gray balanced TRCs using measurements from a limited set of mixed color patches, such as those described above in connection with FIG. 4. A method for doing so is schematically illustrated in FIGS. 10 and 11. Gray balanced TRCs can be generated accurately according to embodiments using, for example, approximately twenty-two mixed CMY gray patches and K patches in similar fashion to that employed by some prior art methods, such as that disclosed in Mestha et al., "Gray Balance Control Loop for Digital Color Printing Systems," Proceedings of 21$^{st}$ International Conference on Digital Printing Technologies, NIP21, pp. 499-505 (2005), which is incorporated by reference in its entirety. However, unlike the prior art solutions, embodiments give TRCs for a coarse correction of the pitch-to-pitch variation, thereby overcoming low frequency variations in ΔE with respect to pitch like those shown in FIG. 6 and Table 2. Since embodiments use relatively few gray and black patches, it is easier to schedule the patches for measurements on a particular pitch in order to construct TRCs more frequently, thus reducing time dependent drifts in performance.

An example of gray balance patches used to obtain gray balanced TRCs in embodiments, using the target patch pattern of, for example, FIG. 4, employs a range of CMY gray patches 212, fully saturated primary color patches 203, and a range of black patches 202. For example, the CMY gray patches 212 can have values of 0, 5, 8, 10, 17, 25, 32, 40, 50, 60, and 74 percent saturation, the CMY solid patches 203 of 100C, 100M, and 100Y, and K patches 202 of 7.5, 10, 15, 25, 40, 55, 75, and 90 percent saturation. These particular values have been advantageous in embodiments, but other values can be employed. The intervals between area coverage values are preferably irregular, and more patches are preferred to be in the highlight range of from 0 to about 20 percent saturation. These 22 patches are distributed across the neutral axis (CMY neutral and K patches) and include three saturated cyan, magenta, and yellow patches. FIG. 4 shows an example of such a gray balance target as it would appear printed on 8.5"×11" paper.

To obtain pitch-based gray balanced TRCs, the target patches of embodiments, particularly those seen in FIG. 4, should be scheduled carefully. An example of a method of doing so according to embodiments is shown in FIGS. 10 and 11. The method can comprise producing a target patch pattern for each pitch 801, measuring each target patch pattern to obtain measured values 802, determining a TRC for each pitch based on the measured values 803, applying each TRC to its respective pitch 804, and repeating until a difference between desired and actual values is less than a threshold 805. Producing a target patch pattern 801 can include producing at least one process gray patch, at least one black-based gray patch, and at least one patch of each primary color 901. Reproduction apparatus of the type in which embodiments can be employed typically include an inline spectrophotometer that is capable of reading one test patch every 3 ms. In printing machines using such a spectrophotometer and able to print about 100 ppm, embodiments require two 8.5"×11" pages 201, 211 for each pitch to acquire the necessary information for TRC construction. Thus, as seen in FIG. 11, producing at least one process gray patch, etc., 901 can include producing 11 process gray patches 902, producing 8 black-based gray patches 903, and producing 1 color patch with maximum coverage values for each primary color 904. Producing 901 can also include producing the process gray patches on a first page for each pitch 905 and producing the black-based and color patches on a second page for each pitch 906. Producing 11 process gray patches 902 can include producing patches with area coverage values of about 0, 5, 8, 10, 17, 25, 32, 40, 50, 60, and 74, but, as mentioned above, other values can be used. Similarly, producing 8 black based patches can include producing patches with area coverage values of about 7.5, 10, 15, 25, 40, 55, 75, and 90, though other values can be used.

To accomplish this method, embodiments thus first schedule printing one first target page 201 for each pitch, which is 10 pages of the gray balance target first page for a 10-pitch photoreceptor, each with 11 patches. Subsequently, embodiments schedule one second target page 211 for each pitch, which is another 10 pages of the gray balance target second page for a 10-pitch photoreceptor, each with the additional 11 patches. The gray balance targets are grouped per pitch to construct the TRC so that the first target page printed on the first pitch is grouped with the second target page printed on the first pitch during the second revolution of the belt, the first target page printed on the second pitch is grouped with the second target page printed on the second pitch during the second revolution of the belt, and so on. For a 10-pitch photoreceptor, a total of 20 pages would be required to complete the measurements required for extracting all of the pitch-based TRCs. The generalization for other media size, e.g., 11"×17" paper, is straightforward.

To obtain TRCs for a given pitch, embodiments use the measured L*a*b* of the target patches corresponding to a given pitch to compute corresponding L*a*b* values relative to paper. It should be noted that, in some other implementations of this technology, absolute L*a*b* values are used. The CMY neutral patch values are then used to obtain CMY TRCs. In the 22-patch example above, 21 such L*a*b* values are computed, and the 10 L*a*b* values from the CMY (neutral) patches are used to obtain CMY TRCs using the method outlined in U.S. Pat. No. 6,621,576, U.S. patent application Ser. No. 11/097,727, and in Mestha et al., "Gray Balance Control Loop for Digital Color Printing Systems," Proceedings of 21$^{st}$ International Conference on Digital Printing Technologies, NIP21, pp. 499-504 (2005), incorporated by reference above. The values for cyan, magenta and yellow are used to find the ΔE vs. white point curve, in which ΔE scales linearly with the density and area coverage of the input patches. The L* values for the black patches are then used to compute black TRCs. This process is repeated for all other patches corresponding to the remaining belt pitch to obtain the remaining pitch-based TRCs and is iterated until converging to a reasonably good gray. Generally, one to two iterations are found sufficient to reach convergence to acceptable gray accuracy.

An alternate approach to building the average pitch-based gray balance TRCs in embodiments comprises scheduling each page containing 11 patches with CMY gray patches of the same digital value for the whole photoreceptor. For a 10-pitch belt, 10 pages of similar patches (e.g., gray 25) would be scheduled, and a total of 220 pages would be required to complete the measurements required for remaining gray levels for extracting all of the pitch-based TRCs. Once the target pattern pages are generated, the 11 TRCs per pitch can be derived as described above. The average of the 11 TRCs for each pitch will then yield the pitch-based TRCs.

Thus, as seen generally in FIGS. 10 and 11, embodiments use an automatic gray balance control system to produce TRCs for all of the primary colors in a reproduction device by printing patches at different pitch, measuring the output colors, and automatically readjusting the tone reproduction curves until a satisfactory level of accuracy is obtained as compared to the theoretical desired output. Pitch-based gray balanced TRCs that are updated frequently for each pitch, with different TRCs for different pitches, is new. The prior art methods do not cover the use of pitch-based TRCs in images. The method of embodiments fills that gap and can enhance the application of consistent color in electrophotographic reproduction and printing.

As with many computer-implemented methods, embodiments can be implemented in the context of modules. In the computer programming arts, a module can be typically implemented as a collection of routines and data structures that performs particular tasks or implements a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims

What is claimed is:

1. A periodic pitch-to-pitch gray balance printer calibration and control method comprising:
   producing a target patch pattern for each of a plurality of pitches on a substrate comprising:
      producing at least one process gray patch;
   measuring each target patch pattern to obtain measured values for each process gray patch in each target patch pattern;
   determining a tone reproduction curve for each pitch based on the measured values for each process gray patch;
   applying the tone reproduction curves to their respective pitches to normalize and optimize printer output; and
   repeating the steps of producing, measuring, determining, and applying until a difference between desired and actual values is less than a predetermined threshold, thereby calibrating the printer.

2. The method of claim 1 wherein producing a target patch pattern comprises:
   producing at least one black-based gray patch.

3. The method of claim 1 wherein producing at least one process gray patch includes producing a plurality of process gray patches with an area coverage value in the range of from about 0 to about 100 percent.

4. The method of claim 2 wherein producing at least one black-based gray patch includes producing a plurality of patches with area coverage values in the range of from about 0 to about 90.

5. The method of claim 2, wherein producing a target patch pattern comprises:
   producing at least one patch of each primary color used by the printer.

6. The method of claim 5 wherein measuring includes employing a color sensor to measure L*a*b* values of the patches of each target patch pattern.

7. The method of claim 6 further comprising scheduling one page per pitch including process gray patches, and one page per pitch including base color and black-based patches.

8. The method of claim 5 wherein determining a tone reproduction curve comprises:
   obtaining calibration data comprising at least one target saturation and at least one maximum desired saturation;
   using the calibration data to produce a tone reproduction curve, thereby setting said tone reproduction curve for use in printing saturated areas.

9. The method of claim 8 wherein one of the at least one target saturation is a primary color's maximum possible saturation.

10. The method of claim 8 wherein one of the at least one target saturation is black's maximum possible saturation.

11. The method of claim 8 wherein the at least one target saturation is a user selected saturation.

12. The method of claim 11 further comprising producing a target patch by printing a calibration patch based on the user selected saturation, measuring a target reflectance of the target patch, and wherein the calibration data further comprises the target reflectance.

13. A printing system comprising:
a storage device adapted to store at least one target patch pattern comprising at least one target patch for each pitch of a multiple pitch element;
a marking engine that includes the multiple pitch element with a plurality of pitches, the marking engine marking a substrate based on the at least one target patch pattern to produce a target patch pattern for each pitch;
a measuring device that obtains a target reflectance from each target patch of the target patch pattern;
a processor that determines at least one tone reproduction curve from calibration data comprising the target reflectances;
the storage device adapted to store said at least one tone reproduction curve for each pitch of the photoreceptor.

14. The printing system of claim 13 wherein said calibration data further comprises at least one target saturation and at least one maximum desired saturation.

15. The printing system of claim 14 wherein the at least one target saturation comprises at least one primary color's maximum possible saturation.

16. The printing system of claim 14 wherein one of the at least one target saturation is black's maximum possible saturation.

17. The printing system of claim 14 wherein the at least one target saturation comprises at least one user selected saturation.

18. The printing system of claim 17 wherein at least one of the at least one target patch is based on the at least one user selected saturation and wherein the calibration data further comprises the at least one maximum desired saturation and the at least one user selected saturation.

19. The printing system of claim 13 wherein said at least one target patch comprises at least one calibration patch printed with black.

20. The printing system of claim 13 wherein said at least one target patch comprises at least one calibration patch printed with at least one primary color.

21. The method of claim 5 wherein producing at least one patch for each primary color used by the printer includes producing patches of each primary color with area coverage values of about 100.

* * * * *